United States Patent
Moon et al.

(10) Patent No.: US 10,280,257 B2
(45) Date of Patent: May 7, 2019

(54) CONTINUOUS PROCESS FOR PRODUCING POLY(TRIMETHYLENE TEREPHTHALATE) CONTAINING LOW LEVELS OF BY-PRODUCTS

(71) Applicant: SK CHEMICALS CO., LTD., Gyeonggi-do (KR)

(72) Inventors: Jung-Me Moon, Gyeonggi-do (KR); Tae-Young Kim, Gyeonggi-do (KR)

(73) Assignee: SK Chemicals Co., Ltd. (KR)

( * ) Notice: Subject to any disclaimer, the term of this patent is extended or adjusted under 35 U.S.C. 154(b) by 50 days.

(21) Appl. No.: 15/519,614

(22) PCT Filed: Oct. 5, 2015

(86) PCT No.: PCT/KR2015/010500
§ 371 (c)(1),
(2) Date: Apr. 17, 2017

(87) PCT Pub. No.: WO2016/064108
PCT Pub. Date: Apr. 28, 2016

(65) Prior Publication Data
US 2017/0240701 A1     Aug. 24, 2017

(30) Foreign Application Priority Data
Oct. 22, 2014  (KR) .................. 10-2014-0143329

(51) Int. Cl.
| | |
|---|---|
| *C08G 63/85* | (2006.01) |
| *C08G 63/183* | (2006.01) |
| *C08G 63/78* | (2006.01) |
| *C08G 63/82* | (2006.01) |

(52) U.S. Cl.
CPC .......... *C08G 63/85* (2013.01); *C08G 63/183* (2013.01); *C08G 63/78* (2013.01); *C08G 63/82* (2013.01)

(58) Field of Classification Search
CPC .................................................. C08G 63/85
See application file for complete search history.

(56) References Cited

U.S. PATENT DOCUMENTS

| | | | |
|---|---|---|---|
| 5,599,900 A | 2/1997 | Bhatia | |
| 6,093,786 A | 7/2000 | Kelsey | |
| 6,277,947 B1* | 8/2001 | Kelsey | C08G 63/78 |
| | | | 524/783 |
| 6,353,062 B1* | 3/2002 | Giardino | C08G 63/183 |
| | | | 526/65 |
| 6,538,076 B2 | 3/2003 | Giardino et al. | |
| 6,657,044 B1 | 12/2003 | Kelsey et al. | |
| 7,132,484 B2 | 11/2006 | Giardino et al. | |
| 7,223,471 B2 | 5/2007 | Seidel et al. | |
| 7,381,787 B2* | 6/2008 | Kelsey | C08G 63/183 |
| | | | 528/275 |
| 2006/0084783 A1 | 4/2006 | Kelsey et al. | |
| 2014/0142272 A1* | 5/2014 | Kim | C08G 63/78 |
| | | | 528/275 |

FOREIGN PATENT DOCUMENTS

| | | |
|---|---|---|
| CN | 1190661 | 8/1998 |
| EP | 3170850 | 5/2017 |
| JP | 11-302365 A | 11/1999 |
| KR | 10-0597172 B1 | 10/2001 |
| KR | 10-2002-0075409 A | 10/2002 |

OTHER PUBLICATIONS

Extended Search Report for European Patent Application No. 15851962.9, dated Apr. 5, 2018, 7 pages.
International Search Report prepared by the Korean International Property Office dated Jan. 13, 2016, for International Application No. PCT/KR2015/010500.

* cited by examiner

*Primary Examiner* — Kuo Liang Peng
(74) *Attorney, Agent, or Firm* — Sheridan Ross P.C.

(57) ABSTRACT

The present invention relates to a continuous process for producing poly(trimethylene terephthalate). According to the process of the present invention, it is possible to continuously produce poly(trimethylene terephthalate) containing low levels of toxic by-products such as acrolein and ally alcohol without additional additives.

12 Claims, 1 Drawing Sheet

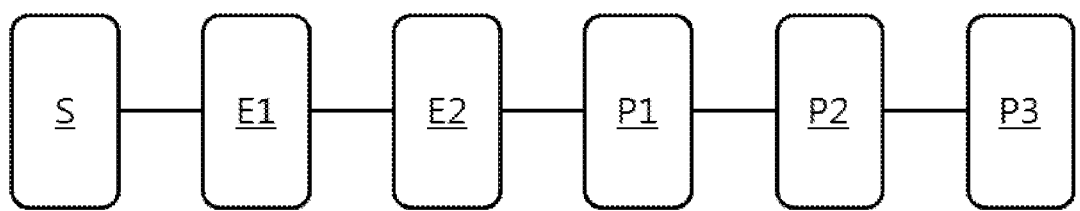

CONTINUOUS PROCESS FOR PRODUCING POLY(TRIMETHYLENE TEREPHTHALATE) CONTAINING LOW LEVELS OF BY-PRODUCTS

CROSS-REFERENCE TO RELATED APPLICATION

This application is a national stage application under 35 U.S.C. 371 and claims the benefit of PCT Application No. PCT/KR2015/010500 having an international filing date of 5 Oct. 2015, which designated the United States, which PCT application claimed the benefit of Korean Patent Application No. 10-2014-0143329 filed on Oct. 22, 2014 with the Korean Intellectual Property Office, the disclosure of each of which is incorporated herein by reference in its entirety.

TECHNICAL FIELD

The present invention relates to a continuous process for producing poly(trimethylene terephthalate) containing low levels of by-products such as dipropylene glycol ether and acrolein and having a high melting point without additional additives.

BACKGROUND OF ART

Poly(trimethylene terephthalate) is a polyester which can be prepared by esterification of 1,3-propanediol and terephthalic acid or dimethyl terephthalate, and polycondensation thereof.

Processes for producing poly(trimethylene terephthalate) have been published several times. For example, U.S. Pat. No. 6,277,947 discloses a process for producing poly(trimethylene terephthalate) by esterification of terephthalic acid with trimethylene glycol in the presence of a catalytic titanium compound, pre-condensation, and polycondensation. Here, initially, the esterification is carried out by at least two steps under the conditions of a mole ratio of trimethylene glycol to terephthalic acid of 1.25 to 2.5, a titanium content of 0 to 40 ppm, a temperature of 245 to 260° C., and a pressure of 1 to 3.5 bar, and 35 to 110 ppm more titanium than in the initial step is added thereto in the at least one subsequent step.

Further, U.S. Pat. No. 6,353,062 discloses a continuous 3-vessel, 3-stage process for preparing poly(trimethylene terephthalate), wherein the first vessel is an esterification reactor for preparing a mixture of bis(3-hydroxypropyl) terephthalate and low molecular weight oligomers, the second vessel is a prepolymerizer, and the third reactor is a final polymerizer or finisher.

Furthermore, U.S. Pat. Nos. 7,132,484 and 6,538,076 disclose a continuous 4-vessel, 4-stage process for preparing poly(trimethylene terephthalate), wherein the first vessel is an esterification reactor for preparing a mixture of bis(3-hydroxypropyl)terephthalate and low molecular weight oligomers, the second vessel is a flasher, the third vessel is a prepolymerizer, and the fourth reactor is a final polymerizer.

In addition, U.S. Pat. No. 5,599,900 discloses a method for eliminating by-products by bringing dihydroxy trimethylene terephthalate or a low molecular weight oligomer thereof which are obtained by esterification of terephthalic acid or dimethyl terephthalate and 1,3-propanediol in contact with an inert gas in the process of a polymerization reaction.

Meanwhile, by-products such as acrolein and allyl alcohol are formed in the preparation process of poly(trimethylene terephthalate). However, these by-products are highly toxic and thus it is preferable to minimize the formation of toxic by-products in the preparation process of poly(trimethylene terephthalate).

There have been several methods known for reducing toxic by-products such as acrolein in the process of preparing poly(trimethylene terephthalate). For example, in order to reduce the production of toxic by-products, U.S. Pat. No. 7,381,787 discloses a method of adding a phosphorus compound; U.S. Pat. No. 6,093,786 discloses a method of adding a hindered phenol and an aromatic organophosphite together; and U.S. Pat. No. 7,223,471 discloses a method of adding polyfunctional alcohols, anhydrides of carboxylic acids, carboxylic acids and their salts, carbohydrates, and so on to the poly(trimethylene terephthalate) melt.

However, the methods of reducing by-products using additional additives as in such known methods not only complicate the production process but may also form other unexpected by-products, and particularly, there is a problem of deteriorating the physical properties of the final polymer.

DETAILED DESCRIPTION OF THE INVENTION

Technical Problem

It is an aspect of the present invention to provide a process which can continuously produce poly(trimethylene terephthalate) containing low levels of toxic by-products such as acrolein and allyl alcohol without additional additives.

Technical Solution

According to the present invention, there is provided a continuous process for producing poly(trimethylene terephthalate), including the steps of:

forming a first esterification product by providing a raw material mixture including 1,3-propanediol and terephthalic acid or dimethyl terephthalate to a first esterification reactor, and then pressurizing and heating under a non-catalytic condition;

forming a second esterification product by providing the first esterification product to a second esterification reactor and then heating under non-catalytic and normal pressure conditions;

forming a prepolymer of poly(trimethylene terephthalate) by providing the second esterification product to a first polymerization reactor and carrying out polycondensation; and forming a high molecular weight poly(trimethylene terephthalate) by providing the prepolymer together with a catalyst to a second polymerization reactor and carrying out polycondensation.

Here, the raw material mixture may contain 1.0 to 1.5 mol of 1,3-propanediol with respect to 1 mol of terephthalic acid or dimethyl terephthalate.

The formation of the first esterification product may be carried out under a pressure of 1 to 4 $kgf/cm^2$ and a temperature of 230 to 250° C. Further, the formation of the second esterification product may be carried out under normal pressure and a temperature of 240 to 260° C.

The first and second esterification products may each include bis(3-hydroxypropyl)terephthalate, low molecular weight polyesters of 1,3-propanediol and terephthalic acid or dimethyl terephthalate, or a mixture thereof.

The first polymerization reactor can be maintained at a temperature of 230 to 270° C. and a pressure of 100 to 300 mmHg.

The second polymerization reactor can be maintained at a temperature of 230 to 270° C. and a pressure of 10 to 200 mmHg.

Here, the polycondensation reaction can be further carried out by providing a stream discharged from the second polymerization reactor to the third polymerization reactor.

On the other hand, the catalyst provided to the second polymerization reactor may be an organic or inorganic compound including one or more active metals selected from the group consisting of titanium and tin.

The catalyst provided to the second polymerization reactor can be added thereto so that 20 to 250 ppm of the active metals are included based on the weight of the final polymer.

The high molecular weight poly(trimethylene terephthalate) may have an intrinsic viscosity of 0.8 to 1.2 dl/g or a weight average molecular weight of 70,000 to 130,000.

According to the present invention, poly(ethylene terephthalate) produced by the above-mentioned process is provided.

The poly(trimethylene terephthalate) may include 2.0 mol % or less of dipropylene glycol ether, and the poly(trimethylene terephthalate) may contain 20 ppm or less of acrolein and 10 ppm or less of allyl alcohol.

The poly(trimethylene terephthalate) may have a melting point of 227° C. or higher.

Hereinafter, the continuous process for producing poly (trimethylene terephthalate) according to a specific embodiment of the present invention will be described in more detail.

Prior to this, the technical terms used in the specification are only for mentioning arbitrary embodiments, and they are not intended to limit the present invention unless there is a particular mention about them.

Further, singular expressions used herein may include plural expressions unless they are differently expressed contextually. In addition, the meaning of the term "include" used in the specification embodies specific characteristics, areas, essence, steps, actions, elements, and/or components, and does not exclude existence or addition of other specific characteristics, areas, integers, steps, actions, elements, components, and/or groups.

Terms including ordinal numbers such as 'first' or 'second' in the present specification can be used for explaining various components, but the components are not limited to or by the terms. Said terms are only used for distinguishing one component from other components. For example, the first element may be called a second element and the second element may be called a first element within the scope of the present invention.

I. Continuous Process for Producing Poly(Trimethylene Terephthalate)

According to one embodiment of the present invention, there is provided a continuous process for producing poly (trimethylene terephthalate), including the steps of:

forming a first esterification product by providing a raw material mixture including 1,3-propanediol and terephthalic acid or dimethyl terephthalate to a first esterification reactor, and then pressurizing and heating under a non-catalytic condition;

forming a second esterification product by providing the first esterification product to a second esterification reactor and then heating under non-catalytic and normal pressure conditions;

forming a prepolymer of poly(trimethylene terephthalate) by providing the second esterification product to a first polymerization reactor and carrying out polycondensation; and forming a high molecular weight poly(trimethylene terephthalate) by providing the prepolymer together with a catalyst to a second polymerization reactor and carrying out polycondensation.

That is, according to the results of research of the present inventors, it has been found that, in the continuous process for producing poly(trimethylene terephthalate) through esterification, pre-condensation and polycondensation using the raw materials, when the esterification and pre-condensation are carried out under a non-catalytic condition and then the polycondensation is carried out by adding a catalyst thereto, the formation of toxic by-products such as acrolein and ally alcohol can be minimized without additional additives, thereby obtaining poly(trimethylene terephthalate) having excellent physical properties.

In addition, it has been found that when the above-mentioned esterification is carried out in two steps, if the first esterification step is carried out under pressure and the second esterification step is carried out under normal pressure, the production of toxic by-products is significantly reduced.

When the second esterification step is carried out under normal pressure as described above, the amount of unreacted 1,3-propanediol contained in the esterification product is lowered, and thus the formation of by-products such as dipropylene glycol ether in the esterification step is minimized, which results in an effect of lowering the amount of toxic by-products such as acrolein and allyl alcohol contained in the final polymer. Further, as the formation of dipropylene glycol ether is minimized, the melting point (Tm) of the final polymer can also be kept high.

Basically, PTT can be prepared by the polycondensation of the esterification product of 1,3-propanediol and terephthalic acid or the transesterification product of 1,3-propanediol and dimethyl terephthalate. In addition, it may involve solid-phase polymerization for obtaining PTT having a higher molecular weight.

PTT can be prepared through a continuous process, a batch process, or the like. The present invention suggests the continuous preparation method of PTT as one embodiment. However, it would be obvious to those skilled in the art that the present invention is not limited to the continuous process and can be performed by a batch process or the like.

As illustrated in FIG. 1, the preparation method of PTT according to one embodiment of the invention forms the esterification product under a non-catalytic condition after providing the raw materials prepared at a slurry melting tank (S) to the esterification reactor.

At this time, the esterification may be continuously carried out through a first esterification reactor (E1) and a second esterification reactor (E2) which are connected in series, wherein the first esterification reactor (E1) is operated under the pressurizing and heating conditions, and the second esterification reactor (E2) is operated under the normal pressure and heating conditions.

Subsequently, the esterification product is provided to a first polymerization reactor (P1) and forms the prepolymer by the polycondensation under a non-catalytic condition, and the prepolymer is mixed with the catalyst and provided to a second polymerization reactor (P2) and additionally subjected to polycondensation. Further, the stream discharged from the second polymerization reactor (P2) may be provided to a third polymerization reactor (P3) and additionally subjected to polycondensation.

Hereinafter, each step included in the continuous production method of PTT according to one embodiment will be described.

i) Formation of Esterification Product from Raw Material Mixture Under a Non-Catalytic Condition 1,3-propanediol and terephthalic acid or dimethyl terephthalate may be used as the raw materials for producing PTT.

The raw materials are mixed and melted in a slurry melting tank (S) to form a slurry phase raw material mixture. At this time, the raw material mixture may be maintained so as to include 1.0 to 1.5 mol of 1,3-propanediol with respect to 1 mol of terephthalic acid or dimethyl terephthalate.

The raw material mixture prepared in the slurry melting tank (S) is transferred to the esterification reactor to form the esterification product. According to one embodiment of the invention, the formation of the esterification product may be continuously carried out at the first esterification reactor (E1) and the second esterification reactor (E2) which are connected in series, and a gaseous by-product stream may be continuously evaporated and eliminated from each esterification reactor. It is preferable for preventing a reverse reaction to eliminate the gaseous by-products including water vapor in the main. At the second esterification reactor (E2), it is preferable to discharge unreacted 1,3-propanediol out of the system. As a non-restrictive example, it may be preferable for process efficiency to transfer the reaction product of the first esterification reactor (E1) to the second esterification reactor (E2) when the relative viscosity thereof reaches 1 or more.

In particular, according to one embodiment, the formation of the esterification product can be carried out by a step of forming a first esterification product by providing a raw material mixture to the first esterification reactor, and then pressurizing and heating under a non-catalytic condition; and a step of forming a second esterification product by providing the first esterification product to a second esterification reactor and then heating under non-catalytic and normal pressure conditions.

Preferably, the formation of the first esterification product can be carried out under a pressure of 1 to 4 kgf/cm$^2$, 1.5 to 3.5 kgf/cm$^2$, or 1.5 to 2.5 kgf/cm$^2$, and a temperature of 230 to 250° C., 235 to 250° C., or 235 to 245° C. Then, the formation of the second esterification product can be carried out under normal pressure, and a temperature of 240 to 260° C., 240 to 255° C., or 245 to 255° C.

The first and second esterification products obtained through the above-mentioned processes may each include bis(3-hydroxypropyl)terephthalate, low molecular weight polyesters (for example, oligomers) of 1,3-propanediol and terephthalic acid or dimethyl terephthalate, or a mixture thereof.

ii) Pre-Polycondensation

The second esterification product is provided to the first polymerization reactor (P1) through a temperature control supply line.

The prepolymerization reaction step is carried out at the first polymerization reactor (P1), wherein an excess of 1,3-propanediol is eliminated from the system, and long-chain molecules are formed and thereby the viscosity of the product increases gradually in this step. Here, a conventional apparatus such as a steam line equipped with a vacuum supplier, a spray condenser, and so on may be used for eliminating an excess of 1,3-propanediol from the system.

According to one embodiment of the invention, the pre-polycondensation is carried out under a non-catalytic condition, similar to the esterification. Preferably, the first polymerization reactor (P1) can be operated under the conditions of maintaining a temperature of 230 to 270° C., 240 to 260° C., or 245 to 260° C., and a pressure of 100 to 300 mmHg, 100 to 250 mmHg, or 150 to 250 mmHg.

Then, the PTT prepolymer discharged from the first polymerization reactor (P1) can have a relative viscosity of 3 to 7. To this end, the residence time in the first polymerization reactor (P1) can be 30 to 90 min.

iii) Final Polycondensation

The PTT prepolymer discharged from the first polymerization reactor (P1) is provided to the second polymerization reactor (P2) through a temperature control supply line. In the second polymerization reactor (P2), a step of increasing the molecular chain length or viscosity of the PTT prepolymer to form a high molecular weight PTT, which is the final polymer, is performed.

In particular, according to the present invention, by adding a catalyst to the supply line connected to the second polymerization reactor (P2) from the first polymerization reactor (P1), the PTT prepolymer is provided together with the catalyst to the second polymerization reactor (P2). In this way, the continuous production method of PTT according to the present invention follows the polycondensation method by adding the catalyst after the prepolymerization, unlike a general process of adding the catalyst to the raw material mixture before the esterification reaction. Through this, the continuous production process of PTT according to the present invention enables the production of PTT having excellent physical properties because the content of dipropylene glycol ether (DPG) is low, a melting point is high, and the formation of toxic by-products such as acrolein can be minimized.

Here, the catalyst provided to the second polymerization reactor (P2) may be a conventional catalyst compound for polycondensation, and it may preferably be an organic or inorganic compound including one or more active metals selected from the group consisting of titanium and tin. As a non-restrictive example, the catalyst may be one or more compounds selected from the group consisting of tetraisopropyl titanate, tetrabutyl titanate, and dibutyltin oxide.

At this time, the catalyst may be added thereto so that 20 to 250 ppm, 50 to 250 ppm, or 50 to 200 ppm of the active metals are included based on the weight of the final polymer. That is, for obtaining the final polymer having a proper color while providing a suitable reaction rate in the second polymerization reactor (P2), it is preferable to control the content of the catalyst within the above-mentioned range.

The second polymerization reactor (P2) in which polycondensation is carried out in the presence of a catalyst in this way can be operated under the conditions of maintaining a temperature of 230 to 270° C., 240 to 260° C., or 245 to 260° C., and a pressure of 10 to 200 mmHg, 10 to 150 mmHg, or 10 to 100 mmHg.

Preferably, the stream discharged from the second polymerization reactor (P2) may be provided to the third polymerization reactor (P3) to carry out an additional polycondensation reaction. Here, maximizing the material transfer of unreacted 1,3-propanediol in the third polymerization reactor (P3) is advantageous for obtaining high molecular weight PTT. Therefore, it is preferable that the third polymerization reactor (P3) has a structure which can maximize the surface area of the polymer, for example, like a structure of a horizontal cylindrical vessel equipped with a stirrer.

Further, the third polymerization reactor (P3) may be operated under the conditions of maintaining a temperature of 230 to 270° C., 240 to 265° C. or 250 to 260° C., and a pressure of 1 mmHg or less.

In this way, in the case of using the second polymerization reactor (P2) and the third polymerization reactor (P3), the residence time at each reactor may be controlled in consideration of the viscosity and the molecular weight of the reaction product. For example, the residence time in the second polymerization reactor (P2) and the third polymerization reactor (P3) may be 30 to 90 min, respectively.

II. Poly(Trimethylene Terephthalate)

According to another embodiment of the invention, a PTT produced by the processes described above is provided.

As PTT is produced by the processes described above, it can contain low levels of dipropylene glycol ether (DPG), have a high melting point (Tm) and contain low levels of toxic by-products such as acrolein and ally alcohol, thereby exhibiting superior physical properties.

PTT finally obtained by the processes disclosed above may have an intrinsic viscosity of 0.8 to 1.2 dl/g or a weight average molecular weight of 70,000 to 130,000. Further, said PTT may show a color L* value of 75 to 85 and a color b* value of 5 to 20.

Particularly, as PTT is produced by the processes disclosed above, it may include significantly low levels of dipropylene glycol ether, for example, 2.0 mol % or less, preferably 1.0 to 2.0 mol %, 1.2 to 1.8 mol %, or 1.5 to 1.6 mol %, based on the final polymer. Because of this low level of dipropylene glycol ether, the PTT can have a high melting point (Tm) of 227° C. or higher, preferably 227 to 228° C., or 227.2 to 227.5° C.

Furthermore, as PTT is produced by the processes disclosed above, it may include low levels of acrolein, for example, 20 ppm or less, 17 ppm or less, 5-17 ppm, or 10-15 ppm, based on the weight of the final polymer. At the same time, the PTT can contain low levels of allyl alcohol, for example, 10 ppm or less, preferably 8 to 10 ppm, or 8 to 9.5 ppm, based on the weight of the final polymer.

PTT that is continuously prepared through a series of processes disclosed above may be pelletized and obtained in a solid state, and can be directly provided to conventional figuration processes such as fiber spinning, film forming, molding, and so on.

Advantageous Effects

The continuous production process of poly(trimethylene terephthalate) according to the present invention enables the production of poly(trimethylene terephthalate) having superior physical properties because the content of dipropylene glycol ether (DPG) is low, the melting point (Tm) is high, and the formation of toxic by-products such as acrolein can be minimized.

BRIEF DESCRIPTION OF THE DRAWING

FIG. 1 schematically illustrates an apparatus which can be used in the preparation method according to one embodiment of the invention.

EXPLANATION OF REFERENCE CHARACTERS

S: Slurry melting tank
E1, E2: Transesterification reactor
P1, P2, P3: Polymerization reactor

DETAILED DESCRIPTION OF THE EMBODIMENTS

Hereinafter, preferable examples are presented to aid in understanding of the present invention. However, the following examples are only for illustrating the present invention, and the present invention is not limited to or by them.

Example 1

A raw material mixture of a homogeneous slurry phase was prepared by mixing 1,3-propanediol and terephthalic acid as raw materials in a slurry melting tank (S). At this time, about 1.3 mol of 1,3-propanediol per 1 mol of terephthalic acid was included in the raw material mixture.

The prepared raw material mixture was transferred from the slurry melting tank (S) to the first esterification reactor (E1), and the esterification was carried out under a pressure of about 2 kgf/cm$^2$ and a temperature of about 245° C. As the esterification proceeded, a mixture of bis(3-hydroxypropyl) terephthalate and oligomers was formed.

Then, a stream discharged from the first esterification reactor (E1) was transferred to the second esterification reactor (E2), and the esterification was continuously carried out under a temperature of about 255° C. and normal pressure. At this time, gaseous by-product streams respectively generated at the first esterification reactor (E1) and the second esterification reactor (E2) were continuously evaporated and eliminated.

Subsequently, the esterification product was transferred to the first polymerization reactor (P1), and the polycondensation reaction was carried out while maintaining a temperature of about 255° C. and a reduced pressure condition of 100 to 200 mmHg. The stream discharged from the first polymerization reactor (P1) was provided to the second polymerization reactor (P2) after adding a catalyst thereto. At this time, tetraisopropyl titanate was used as the catalyst, and the content thereof was controlled so that about 180 ppm of titanium atoms were included therein based on the weight of the final polymer.

The polycondensation at the second polymerization reactor (P2) was carried out while maintaining a temperature of about 260° C. and a reduced pressure condition of 10 to 100 mmHg, and the viscosity of the reaction product gradually increased. The stream discharged from the second polymerization reactor (P2) was transferred to the third polymerization reactor (P3), and the polycondensation was carried out while maintaining a temperature of about 260° C. and a reduced pressure condition of 1 mmHg or less.

PTT (intrinsic viscosity: about 0.94 dl/g, weight average molecular weight: 98,900) was obtained by the above method, and the final polymer was obtained in a pelletized solid form.

Example 2

PTT (intrinsic viscosity: about 0.95 dl/g, weight average molecular weight: 99,900) was obtained in the same manner as in Example 1, except that the second esterification reactor (E2) was operated at a temperature of about 250° C. under normal pressure.

Comparative Example 1

PTT (intrinsic viscosity: about 0.96 dl/g, weight average molecular weight: 101,300) was obtained in the same manner as in Example 1, except that the second esterification reactor (E2) was operated at a temperature of about 255° C. under a pressure of about 1.5 kgf/cm².

Comparative Example 2

PTT (intrinsic viscosity: about 0.96 dl/g, weight average molecular weight: 101,500) was obtained in the same manner as in Example 1, except that the second esterification reactor (E2) was operated at a temperature of about 255° C. under a pressure of about 2.0 kgf/cm².

Comparative Example 3

PTT (intrinsic viscosity: about 0.95 dl/g, weight average molecular weight: 99,800) was obtained in the same manner as in Example 1, except that the second esterification reactor (E2) was operated at a temperature of about 255° C. under a pressure of about 2.5 kgf/cm².

Comparative Example 4

PTT (intrinsic viscosity: about 0.94 dl/g, weight average molecular weight: 94,000) was obtained in the same manner as in Example 1, except that the second esterification reactor (E2) was operated at a temperature of about 255° C. under a pressure of about 3.0 kgf/cm².

Comparative Example 5

PTT (intrinsic viscosity: about 0.95 dl/g, weight average molecular weight: 99,600) was obtained in the same manner as in Example 1, except that the second esterification reactor (E2) was operated at a temperature of about 250° C. under a pressure of about 2 kgf/cm².

Experimental Examples

The physical properties of PTT prepared by the examples and comparative examples were tested by the following methods, and the results are listed in Tables 1 and 2 below.

1) Content of acrolein and allyl alcohol: 0.5 g of a powdery specimen prepared by cryo-milling was collected and sealed in a glass bottle, and the content of acrolein and allyl alcohol was quantitatively analyzed through gas chromatography after heating the same at 150° C. for 30 min.

2) Intrinsic viscosity (IV): After dissolving PTT in o-chlorophenol to have a concentration of 1.2 g/dl, the intrinsic viscosity was measured at 35° C. by using an Ubbelohde viscometer.

3) Quantification of dipropylene glycol ether (DPG): Confirmed by NMR analysis (converting the average value of peaks at 2.2 ppm, 3.8 ppm, and 4.5 ppm as analyzed by 600 MHz H NMR to mol %).

4) Melting point (Tm): The sample was filled in an aluminum pan using a differential scanning calorimeter (DSC), heated up to 280° C. at 10° C./min, held at 280° C. for 2 min, and then cooled at −150° C./min. Then, when the temperature was raised up to 280° C. at 10° C./min, the temperature at the position of the apex of the endothermic curve was defined as the melting point (Tm).

TABLE 1

|  | E2 reactor Temperature (° C.) | E2 reactor Pressure (kgf/cm²) | DPG content in E2 product (mol %) |
|---|---|---|---|
| Example 1 | 255 | 1.0 | 1.2 |
| Example 2 | 250 | 1.0 | 1.1 |
| Comparative Example 1 | 255 | 1.5 | 2.0 |
| Comparative Example 2 | 255 | 2.0 | 2.0 |
| Comparative Example 3 | 255 | 2.5 | 2.1 |
| Comparative Example 4 | 255 | 3.0 | 2.3 |
| Comparative Example 5 | 250 | 2.0 | 2.3 |

TABLE 2

|  | DPG content in polymer (mol %) | Acrolein content in polymer (ppm) | Allyl alcohol content in polymer (ppm) | Polymer IV (dl/g) | Polymer Tm (° C.) |
|---|---|---|---|---|---|
| Example 1 | 1.6 | 15 | 8 | 0.94 | 227.2 |
| Example 2 | 1.5 | 14 | 9 | 0.95 | 227.3 |
| Comparative Example 1 | 2.9 | 30 | 10 | 0.96 | 225.6 |
| Comparative Example 2 | 2.4 | 25 | 9 | 0.95 | 226.2 |
| Comparative Example 3 | 2.4 | 32 | 10 | 0.94 | 226.2 |
| Comparative Example 4 | 2.6 | 28 | 10 | 0.94 | 226.0 |
| Comparative Example 5 | 2.7 | 27 | 9 | 0.95 | 225.9 |

As shown in Tables 1 and 2, it was confirmed that the content of dipropylene glycol ether (DPG) in the esterification product (E2 product) formed by the processes of the examples was as low as 1.2 mol % or less, and the content of DPG in the final polymer was as low as 1.6 mol % or less.

In particular, it was confirmed that PTT formed by the processes of the examples contained low levels of dipropylene glycol ether (DPG), causing less reduction in the melting point (Tm), and had a melting point of 227° C. or higher. In addition, PTT formed by the processes of the examples contained 15 ppm or less of acrolein and 9 ppm or less of allyl alcohol, and showed low levels of by-products compared with PTT according to the comparative examples.

What is claimed is:

1. A continuous process for producing poly(trimethylene terephthalate), comprising the steps of:
    forming a first esterification product by providing a raw material mixture including 1,3-propanediol and terephthalic acid or dimethyl terephthalate to a first esterification reactor, and then pressurizing and heating under a non-catalytic condition;
    forming a second esterification product by providing the first esterification product to a second esterification reactor and heating under non-catalytic and normal pressure conditions;
    forming a prepolymer of poly(trimethylene terephthalate) by providing the second esterification product to a first polymerization reactor and carrying out polycondensation; and forming a high molecular weight poly(trimethylene terephthalate) by providing the prepolymer together with a catalyst to a second polymerization reactor and carrying out polycondensation.

2. The continuous process for producing poly(trimethylene terephthalate) according to claim 1, wherein the raw material mixture contains 1.0 to 1.5 mol of 1,3-propanediol with respect to 1 mol of terephthalic acid or dimethyl terephthalate.

3. The continuous process for producing poly(trimethylene terephthalate) according to claim 1, wherein the formation of the first esterification product is carried out under a pressure of 1 to 4 kgf/cm$^2$ and a temperature of 230 to 250° C.

4. The continuous process for producing poly(trimethylene terephthalate) according to claim 1, wherein the formation of the second esterification product is carried out under normal pressure and a temperature of 240 to 260° C.

5. The continuous process for producing poly(trimethylene terephthalate) according to claim 1, wherein the first and second esterification products each includes bis(3-hydroxypropyl)terephthalate, low molecular weight polyesters of 1,3-propanediol and terephthalic acid or dimethyl terephthalate, or a mixture thereof.

6. The continuous process for producing poly(trimethylene terephthalate) according to claim 1, wherein the first polymerization reactor is maintained at a temperature of 230 to 270° C. and a pressure of 100 to 300 mmHg.

7. The continuous process for producing poly(trimethylene terephthalate) according to claim 1, wherein the second polymerization reactor is maintained at a temperature of 230 to 270° C. and a pressure of 10 to 200 mmHg.

8. The continuous process for producing poly(trimethylene terephthalate) according to claim 1, wherein the polycondensation reaction is further carried out by providing a stream discharged from the second polymerization reactor to the third polymerization reactor.

9. The continuous process for producing poly(trimethylene terephthalate) according to claim 1, wherein the catalyst provided to the second polymerization reactor is an organic or inorganic compound including one or more active metals selected from the group consisting of titanium and tin.

10. The continuous process for producing poly(trimethylene terephthalate) according to claim 1, wherein the catalyst provided to the second polymerization reactor is one or more compounds selected from the group consisting of tetraisopropyl titanate, tetrabutyl titanate, and dibutyltin oxide.

11. The continuous process for producing poly(trimethylene terephthalate) according to claim 1, wherein the catalyst provided to the second polymerization reactor is added so that 20 to 250 ppm of the active metals are included based on the weight of the final polymer.

12. The continuous process for producing poly(trimethylene terephthalate) according to claim 1, wherein the high molecular weight poly(trimethylene terephthalate) has an intrinsic viscosity of 0.8 to 1.2 dl/g or a weight average molecular weight of 70,000 to 130,000.

* * * * *